United States Patent Office 3,493,586
Patented Feb. 3, 1970

3,493,586
3-(β-ARYL-β-(ARYLTHIO) (OR ARYLSELENO)-PROPIONYL)PYRONE PRODUCTS
Stephen J. Kuhn and John S. McIntyre, Sarnia, Ontario, Canada, assignors to The Dow Chemical Company, Midland, Mich., a corporation of Delaware
No Drawing. Original application Apr. 24, 1967, Ser. No. 632,940. Divided and this application Jan. 23, 1969, Ser. No. 793,540
Int. Cl. C07d 7/16; A01n 9/28
U.S. Cl. 260—343.5               5 Claims

ABSTRACT OF THE DISCLOSURE

The present disclosure is concerned with the novel 3-(β-aryl-β-(arylthio) (or arylseleno)-propionyl)pyrone product of the following formula:

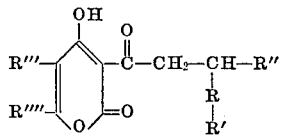

wherein R represents sulfur or selenium; R' represents a phenyl radical of the formula

wherein Z represents bromo, chloro, or loweralkyl of from 1 to 4, both inclusive, carbon atoms, and $n$ represents 0 or 1; R" represents 2-thienyl, 9-phenanthryl, phenyl, or phenyl substituted by from 1 to 2 substituents, each of which is independently bromo, chloro, methyl, or methoxy; and R''' represents hydrogen and R'''' represents hydrogen methyl, or phenyl.

---

The products of the present disclosure are useful as parasiticides, particularly as agents to control the growth of fungi and bacteria, such as *Candida albicans*, *Bacillus subtilis*, *Aspergillus terreus*, *Pullularia pullulans*, tomato late blight, *Staphylococcus aureus*, rice blast, and *Trichophyton mentagrophytes*; and products are also useful as herbicides for the control of weeds, such as bindweed and pigweed.

CROSS-REFERENCE TO RELATED APPLICATIONS

This application is a division of our copending application, Ser. No. 632,940, filed Apr. 24, 1967.

BACKGROUND OF THE INVENTION

Certain compounds having the following type structure:

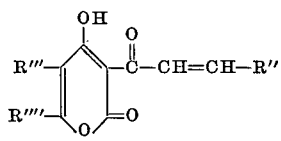

are known in the prior art.

SUMMARY OF THE INVENTION

It has now been found that when such compounds:

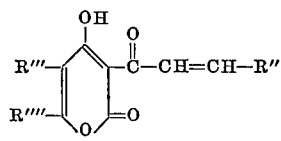

are reacted with an arylthio or arylselenol of the formula

H—R—R' there are obtained new compounds of the formula

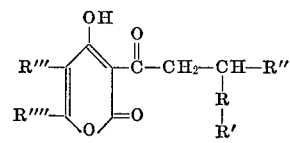

As noted foregoing, these products are useful as parasiticides and as herbicides.

DESCRIPTION OF THE PREFERRED EMBODIMENTS

The products of the present invention are prepared by causing the reaction of an arylthiol or arylselenol of the formula H—R—R' and a pyrone compound of the formula:

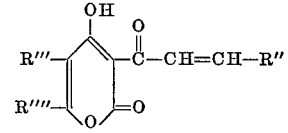

The reaction results in the preparation of the desired products of the formula

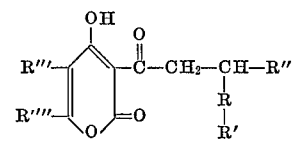

In the above and succeeding formulae in the present specification and claims, R represents sulfur or selenium; R' represents a phenyl radical of the formula

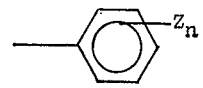

wherein Z represents bromo, chloro, or loweralkyl of from 1 to 4, both inclusive, carbon atoms, and $n$ represents 0 or 1; R" represents 2-thienyl, 9-phenanthryl, phenyl, or phenyl substituted by from 1 to 2 substituents, each of which is independently bromo, chloro, methyl, or methoxy; and R''' represents hydrogen and R'''' represents hydrogen, methyl, or phenyl.

The reaction of arylthiol or arylselenol and the pyrone compound is catalyzed by a small amount of an organic secondary amine, such as dialkylamine or piperidine. The reaction is conveniently carried out in an inert liquid reaction medium. As such reaction medium, organic liquids are typically employed; hydrocarbons, alcohols, ethers, and halogenated alkanes are classes of organic liquids suitable for this purpose. The reaction goes forward under temperatures of a wide range, such as from room temperatures to 110° C., or higher. However, when catalyst is employed, less severe reaction conditions suffice and the reaction is conveniently and preferably conducted a·· temperatures of from 30° to 80° C.

The amounts of the reactants employed are not critical, some of the desired product being obtained when employing the reactants in any amounts. However, the reaction consumes the reactants in amounts representing equimolecular amounts, and the supplying of the reactants in such amounts avoids the deleterious effects of an excess amount of either reactant and is accordingly preferred. A minor amount of the secondary amine catalyst is sufficient to catalyze the reaction. The best reactant mole ratio has been found to be 1:1:0.01 (pyrone:arylthiol or arylselenol:amine).

In carrying out the reaction, the reactants are contacted with one another in the reaction temperature range, conveniently in reaction medium, as discussed above, and preferably in the presence of a catalytic amount of secondary amine. Speed of the reaction is dependent upon the conditions under which it is carried out. When no catalyst is employed, several hours may be required to obtain high yields; when catalyst is used, reaction times of several minutes or less to one-half hour are generally sufficient. The reaction mixture may be permitted to stand for a period of time following completion of the contacting of the reactants to assure completion of the reaction. Following any such standing period, the reaction mixture is processed in conventional procedures to separate the product. As the products are typically crystalline solids which precipitate in the reaction mixture, separation is most readily carried out by filtration.

The following examples illustrate the best mode now known for the practice of the present invention and will enable those skilled in the art to practice the same.

EXAMPLE I: 3-(3-PHENYL-3-(PHENYLTHIO)PROPIONYL)-4-HYDROXY-6-METHYL-2-PYRONE 3-cinnamoyl-4-hydroxy-6-methyl-2-pyrone (25.6 grams; 0.1 mole) and benzenethiol (11.0 grams; 0.1 mole) were mixed with 100 milliliters of benzene and the resulting mixture heated slowly to a temperature of 40–50° C. Approximately 3–4 drops of piperidine were then added to the mixture. The operations were carried out with thorough stirring of the reaction mixture. The reaction mixture was then heated on a water bath (at a temperature of 60–70° C.) for 30 minutes and thereafter permitted to cool. Cooling of the reaction mixture resulted in the precipitation therein of the desired 3-(3-phenyl-3-(phenylthio)propionyl)-4-hydroxy-6-methyl-2-pyrone product. The product was separated by filtration, the separated product washed with cold ethanol, and the washed product recrystallized from boiling acetone-ethanol 1:1 mixture (by weight). The product thus obtained melted at 133–35° C.

Other representative products of the present invention, prepared in essentially the same procedures as those reported in Example I, include those identified in the following examples, in which the symbol "M.W." is used as an abbreviation for the term "molecular weight," and the symbol "M.P." is used as an abbreviation for the term "melting point."

3-cinnamoyl-4-hydroxy-6-methyl-2-pyrone and benzeneselenol are reacted together to yield 3-(3-phenyl-3-(phenylseleno)propionyl)-4-hydroxy-6-methyl-2-pyrone product, M.P. 125° C.

3-cinnamoyl-4-hydroxy-2-pyrone and benzenethiol are reacted together to yield 3-(3-phenyl-3-(phenylthio)propionyl)-4-hydroxy-2-pyrone, M.W. of 352.4.

3-cinnamoyl-4-hydroxy-6-methyl-2-pyrone is reacted with o-toluenethiol to obtain 3-(3-phenyl-3-(o-tolythio)propionyl)-4-hydroxy-6-methyl-2-pyrone, M.P. 112–115° C.

3-cinnamoyl-4-hydroxy-6-phenyl-2-pyrone is reacted with o-tolueneselenol, yielding 3-(3-phenyl-3-(o-tolylseleno)propionyl)-4-hydroxy-6-phenyl-2-pyrone, M.W. of 489.4.

3-cinnamoyl-4-hydroxy-6-methyl-2-pyrone is reacted with m-toluenethiol to obtain 3-(3-phenyl-3-(m-tolylthio)propionyl)-4-hydroxy-6-methyl-2-pyrone, M.P. 68–70° C.

3-(3-(2-thienyl)acryloyl)-4-hydroxy-6-phenyl-2-pyrone is reacted with o-chlorobenzenethiol to obtain 3-(3-(2-thienyl)-3-(o-chlorophenylthio)propionyl)-4-hydroxy-6-phenyl-2-pyrone, M.W. of 469.

3-cinnamoyl-4-hydroxy-6-methyl-2-pyrone is reacted with p-toluenethiol to yield 3-(3-phenyl-3-(p-tolythio)propionyl)-4-hydroxy-6-methyl-2-pyrone, M.P. 134–5° C.

3-cinnamoyl-4-hydroxy-6-methyl-2-pyrone is reacted with p-tert-butylbenzenethiol to obtain 3-(3-phenyl-3-(p-tert-butylphenylthio)propionyl)-4-hydroxy-6-methyl-2-pyrone, M.P. 77–79° C.

3-(3-(9-phenanthryl)acryloyl)-4-hydroxy-2-pyrone is reacted with m-bromobenzenethiol, yielding 3-(3-(9-phenanthryl)-3-(m-bromophenylthio)propionyl)-4-hydroxy-2-pyrone, M.W. of 531.4.

3-(3-(p-tolyl)acryloyl)-4-hydroxy-6-methyl-2-pyrone is reacted with m-bromobenzeneselenol, yielding 3-(3-p-tolyl)-3-(m-bromophenylseleno)-4-hydroxy-6-methyl-2-pyrone product, M.W. of 506.3.

3-cinnamoyl-4-hydroxy-6-methyl-2-pyrone is reacted with p-chlorobenzenethiol, yielding 3-(3-phenyl-3-(p-chlorophenylthio)propionyl)-4-hydroxy-6-methyl-2-pyrone, M.P. 131° C.

3-(3-(p-methoxyphenyl)acryloyl)-4-hydroxy-6-methyl-2-pyrone is reacted with benzenethiol, yielding 3-(3-(p-methoxyphenyl)-3-(phenylthio)propionyl)-4-hydroxy-6-methyl-2-pyrone, M.W. of 380.5.

3-cinnamoyl-4-hydroxy-6-methyl-2-pyrone is reacted with p-bromobenzenethiol, yielding 3-(3-phenyl-3-(p-bromophenylthio)propionyl)-4-hydroxy-6-methyl-2-pyrone, M.P. 113° C.

3-cinnamoyl-4-hydroxy-2-pyrone is reacted with p-tert-butylbenzeneselenol, yielding 3-(3-phenyl-3-(p-tert-butylphenylseleno)propionyl)-4-hydroxy-2-pyrone, M.W. of 455.4.

3-(3-(m-chlorophenyl)acryloyl)-4-hydroxy-6-methyl-2-pyrone is reacted with p-chlorobenzenethiol, yielding 3-(3-(m-chlorophenyl)-3-(p-chlorophenylthio)-propionyl)-4-hydroxy-6-methyl-2-pyrone, M.P. 123–124° C.

3-(3-(p-tolyl)acryloyl)-4-hydroxy-6-phenyl-2-pyrone is reacted with benzenethiol, yielding 3-(3-(p-tolyl)-3-(phenylthio)propionyl)-4-hydroxy-6-phenyl-2-pyrone, M.W. of 442.539.

When one of the products of the present invention is employed as a parasiticide, the unmodified product can be utilized. However, the present invention also encompasses the utilization of the product together with a parasiticide adjuvant. In such utilization, the product can be dispersed on a finely divided solid and the resulting preparation employed as a dust. Also, a product of the present invention, or a composition comprising a product of the present invention and a finely divided solid, can be dispersed in water with the aid of a wetting agent and the resulting aqueous suspension employed as a spray. In other procedures, a product according to the present invention can be employed as the constituent of organic liquid compositions, oil-in-water or water-in-oil emulsions, or water dispersion, with or without the addition of a wetting, dispersing, or emulsifying agent.

In representative procedures, the incorporation of 0.05 percent, by weight, of 3-(3-phenyl-3-(p-bromophenylthio)propionyl)-4-hydroxy-6-methyl-2-pyrone into a standard bacteriological culture medium resulted in a modified medium which gave complete inhibition of the growth of *Bacillus subtilis*.

PREPARATION OF STARTING MATERIALS

The arylselenol starting materials are prepared in accordance with known procedures. See Methoden der Organischen Chemie (Houben-Weyl), Band IX, especially pages 951–970 (Georg Thieme Verlag, Stuttgart, Germany, 1955).

The substituted 2-pyrone starting materials of the present invention are prepared by known procedures whereby a base-catalyzed condensation reaction is initiated between dehydroacetic acid and the appropriate aromatic aldehyde. This preparation is further taught by Wiley et al., JACS, 77, 5102 (1955).

We claim:
1. A compound of the formula

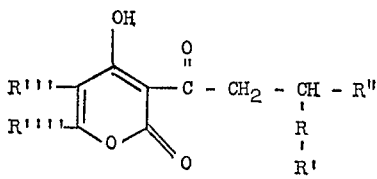

wherein R represents sulfur or selenium; R' represents a phenyl radical of the formula

wherein Z represent bromo, chloro, or loweralkyl of from 1 through 4 carbon atoms, and $n$ represents 0 or 1; R" represents 2-thienyl, 9-phenanthryl, phenyl, or phenyl substituted by from 1 to 2 substituents, each of which is independently bromo, chloro, methyl, or methoxy; and R'" represents hydrogen and R"" represents hydrogen, methyl, or phenyl.

2. A compound of claim 1 which is of the formula

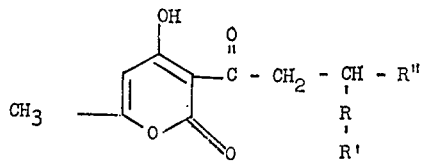

wherein R represents sulfur or selenium; R' represents a phenyl radical of the formula

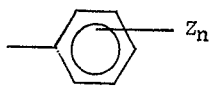

wherein Z represents bromo, chloro, or loweralkyl of from 1 through 4 carbon atoms, and $n$ represents 0 or 1; and R" represents 2-thienyl, 9-phenanthryl, phenyl, or phenyl substituted by from 1 to 2 substituents, each of which is independently bromo, chloro, methyl, or methoxy.

3. A compound of claim 2 which is 3-(3-phenyl-3-(phenylthio)propionyl)-4-hydroxy-6-methyl-2-pyrone.

4. A compound of claim 2 which is 3-(3-phenyl-3-(p-tert-butylphenylthio)propionyl)-4-hydroxy - 6 - methyl-2-pyrone.

5. A compound of claim 2 which is 3-(3-phenyl-3-(phenylseleno)propionyl) - 4 - hydroxy-6-methyl-2-pyrone.

References Cited
UNITED STATES PATENTS
3,206,476   9/1965   Collins _____ 260—343.5

ALEX MAZEL, Primary Examiner
A. M. T. TIGHE, Assistant Examiner

U.S. Cl. X.R.
71—88; 260—332.2; 424—275, 281